(12) United States Patent
Ausschnitt et al.

(10) Patent No.: US 9,360,858 B2
(45) Date of Patent: Jun. 7, 2016

(54) ALIGNMENT DATA BASED PROCESS CONTROL SYSTEM

(75) Inventors: Christopher P. Ausschnitt, Naples, FL (US); Timothy A. Brunner, Ridgefield, CT (US); Allen H. Gabor, Katonah, NY (US); Oleg Gluschenkov, Tannersville, NY (US); Vinayan C. Menon, Hopewell Junction, NY (US)

(73) Assignee: GLOBALFOUNDRIES INC., Grand Cayman (CY)

( * ) Notice: Subject to any disclaimer, the term of this patent is extended or adjusted under 35 U.S.C. 154(b) by 671 days.

(21) Appl. No.: 13/204,955

(22) Filed: Aug. 8, 2011

(65) Prior Publication Data

US 2013/0041494 A1 Feb. 14, 2013

(51) Int. Cl.
*G06F 19/00* (2011.01)
*G05B 19/401* (2006.01)

(52) U.S. Cl.
CPC ...... *G05B 19/401* (2013.01); *G05B 2219/2602* (2013.01); *G05B 2219/45031* (2013.01)

(58) Field of Classification Search
CPC .................................................. H01L 21/67242
USPC ......................................... 700/26, 51, 57, 98
See application file for complete search history.

(56) References Cited

U.S. PATENT DOCUMENTS

| | | | |
|---|---|---|---|
| 6,823,231 B1 | 11/2004 | Bode et al. | |
| 7,126,668 B2 | 10/2006 | Smith et al. | |
| 7,142,941 B2 | 11/2006 | Mack et al. | |
| 7,310,789 B2 | 12/2007 | Seligson et al. | |
| 7,342,643 B2 | 3/2008 | Park et al. | |
| 7,476,473 B2 | 1/2009 | Asano | |
| 7,544,449 B1* | 6/2009 | Smith et al. | 430/30 |
| 7,767,956 B2 | 8/2010 | Lakkapragada et al. | |
| 7,804,994 B2 | 9/2010 | Adel et al. | |
| 7,808,613 B2 | 10/2010 | Lof | |
| 7,842,442 B2 | 11/2010 | Seltmann et al. | |
| 7,846,624 B2 | 12/2010 | Smith et al. | |
| 7,853,920 B2 | 12/2010 | Preil et al. | |
| 2006/0271225 A1* | 11/2006 | Schulze et al. | 700/108 |
| 2009/0186286 A1* | 7/2009 | Ausschnitt et al. | 430/30 |
| 2010/0095264 A1* | 4/2010 | Huang et al. | 716/19 |
| 2010/0294955 A1 | 11/2010 | Wang et al. | |
| 2010/0312374 A1* | 12/2010 | Tsai et al. | 700/110 |

OTHER PUBLICATIONS

Fricker, "Analyzing LASIK Optical Data Using Zernike Functions" MATLAB Digest. The Mathworks Inc. Jan. 2008 pp. 1-6.*

(Continued)

*Primary Examiner* — Mohammad Ali
*Assistant Examiner* — Emilio J Saavedra
(74) *Attorney, Agent, or Firm* — Scully Scott Murphy and Presser

(57) ABSTRACT

Deformation of a substrate due to one or more processing steps is determined by measuring substrate alignment data at lithographic processing steps before and after the one or more processing steps. Any abnormal pattern in the alignment data differential is identified by comparing the calculated alignment data differential with previous data accumulated in a database. By comparing the abnormal pattern with previously identified tool-specific patterns for alignment data differential, a processing step that introduces the abnormal pattern and/or the nature of the abnormal processing can be identified, and appropriate process control measures can be taken to rectify any anomaly in the identified processing step.

25 Claims, 10 Drawing Sheets

(56) References Cited

OTHER PUBLICATIONS

Levinson "Principles of Lithography" SPIE—The International Society for Optical Engineering, 2005 Chapters 1, 6, 9.*

Yang, Qi "A Study of Semiconductor Microresonators in Chip-Scale Wavelength Division Multiplexing (CS-WDM) Systems" University of Southern California May 2008, 158 Pgs.*

Owen et al., "Characterization of Deformation Induced by Micro-Second Laser Anneal Using CGS Interferometry" 16th IEEE International Conference on Advanced Thermal Processing of Semiconductors—RTP2008, pp. 1-7.*

Choi et al., "Distortion and overlay performance of UV step and repeat imprint lithography" Microelectronic Engineering vols. 78-79, Mar. 2005, pp. 633-640 Proceedings of the 30th International Conference on Micro- and Nano-Engineering.*

Shetty et al., "Impact of Laser Spike Annealing Dwell Time on Wafer Stress and Photolithography Overlay Errors" International Workshop on Junction Technology, 2009. IWJT Jun. 11-12, 2009, pp. 119-122.*

Lin, H.M. et al., "Improve Overlay Control and Scanner Utilization Through High Order Corrections" Proc. of SPIE (2008) pp. 69222R1-69222R8, vol. 6922.

* cited by examiner

ALIGNMENT DATA BASED PROCESS CONTROL SYSTEM

BACKGROUND

The present disclosure generally relates to process control methods, and particularly to methods of controlling semiconductor manufacturing processes employing alignment data generated during lithographic processing steps.

Various processing steps such lithographic exposure and development, deposition, etching, and planarization are employed in semiconductor manufacturing. Most processes that add material, such as deposition, or remove material, such as etch and planarization, alter the distribution of material on a substrate. The alteration in the distribution of the material on the substrate causes structural changes in the substrate by deforming the substrate.

Stress liners and stress-generating embedded elements are intended to introduce stress into a substrate, which inevitably causes global bowing of the substrate. In addition to such elements that are intended to introduce stress, deposition, etch, or planarization of any material on a substrate typically introduces some degree of deformation in the substrate.

The pattern and the degree of deformation of a substrate depend on the type of processing and the tool employed to effect the processing. For example, low temperature chemical vapor deposition (LPCVD) tools tend to have a thickness pattern in which the center region and regions in the immediate vicinity of rail marks have a lesser thickness than the rest of the substrate. Etch tools may have an inherent center-to-edge nonuniformity in the amount of material removed from the substrate. Chemical mechanical planarization (CMP) tools may have tool-specific non-uniformity in the removal rate so that the remaining material on a substrate tends to be thick or thin in a particular region relative to a wafer notch or other global alignment features.

In order to maintain a high-yield stable manufacturing line, process deviations in the various tools employed in a manufacturing line need to be detected promptly, and any process deviations need to be corrected as quickly as possible.

BRIEF SUMMARY

Deformation of a substrate due to one or more processing steps is determined by measuring substrate alignment data at lithographic processing steps before and after the one or more processing steps. Any abnormal pattern in the alignment data differential is identified by comparing the calculated alignment data differential with previous data accumulated in a database. By comparing the abnormal pattern with previously identified tool-specific patterns for alignment data differential, a processing step that introduces the abnormal pattern and/or the nature of the abnormal processing can be identified, and appropriate process control measures can be taken to rectify any anomaly in the identified processing step.

According to an aspect of the present disclosure, a method of controlling a manufacturing sequence including at least one processing step is provided. The method includes: generating a process model that correlates at least one mode of process variation within at least one processing step with a pattern in a corresponding alignment data differential between pre-processing alignment data and post-processing data, wherein the pre-processing data is generated at a first alignment step prior to the at least one processing step, and the post-processing alignment data is generated at a second alignment step after the at least one processing step; measuring first alignment data on a substrate at the first alignment step; performing the at least one processing step on the substrate after the first alignment step; measuring second alignment data on the substrate at the second alignment step; calculating an alignment data differential for the substrate by subtracting the first alignment data from the second alignment data; identifying a mode of process variation by matching a pattern in the calculated alignment data differential for the substrate with the process model; and altering operational procedure of a processing tool associated with the identified mode of process variation based on a predetermined processing tool operation protocol.

According to another aspect of the present disclosure, a system for controlling a manufacturing sequence is provided. The system includes at least one processing step, the system including at least one processing tool, at least one alignment tool, and at least one computing means. The at least one processing tool is configured to perform at least one processing step. The at least one computing means is configured to perform the steps of: storing a process model that correlates at least one mode of process variation within the at least one processing step with a pattern in alignment data differential between pre-processing alignment data and post-processing data, wherein the pre-processing data is generated at a first alignment step prior to the at least one processing step, and the post-processing alignment data is generated at a second alignment step after the at least one processing step; receiving first alignment data on a substrate that is measured by one of the at least one alignment tool at the first alignment step; receiving second alignment data on the substrate that is measured by the one or another of the at least one alignment tool at the second alignment step; calculating alignment data differential for the substrate by subtracting the first alignment data from the second alignment data; identifying a mode of process variation by matching a pattern in the calculated alignment data differential for the substrate with the process model; and generating instructions for altering operational procedure of a processing tool among the at least one processing tool, wherein the processing tool is associated with the identified mode of process variation.

DETAILED DESCRIPTION

Figure 1:
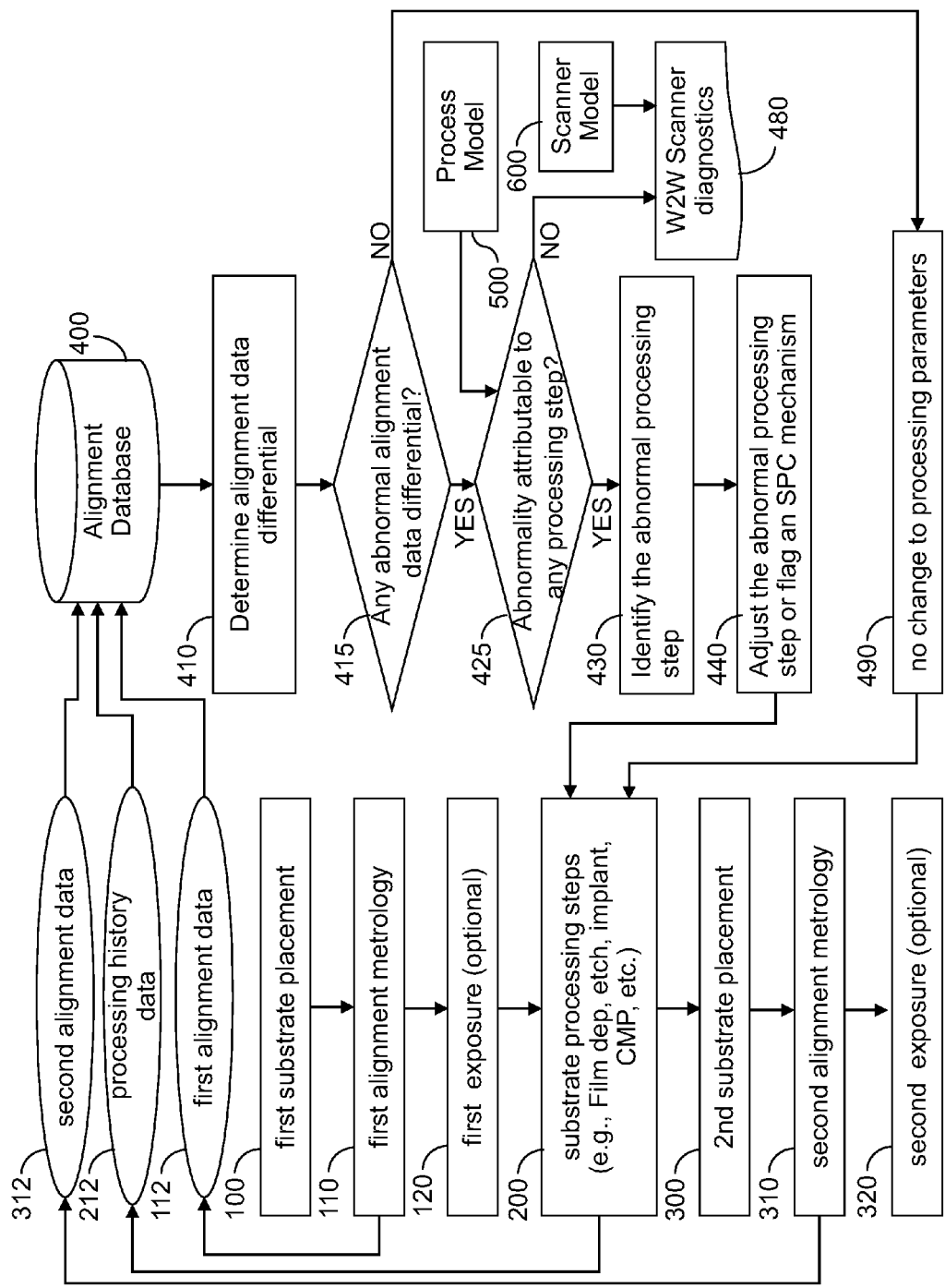
FIG. 1 is flow chart that illustrates steps for an alignment data based process control method according to an embodiment of the present disclosure.

As stated above, the present disclosure relates to methods of controlling semiconductor manufacturing processes employing alignment data generated during lithographic processing steps, which are now described in detail with accompanying figures. Like and corresponding elements mentioned herein and illustrated in the drawings are referred to by like reference numerals. The drawings are not necessarily drawn to scale.

Referring to FIG. 1, a flow chart illustrates steps for an alignment data based process control method according to an embodiment of the present disclosure. The alignment data based process control method can be employed to control a manufacturing sequence including at least one processing step, which can be a single non-lithographic processing step or a plurality of non-lithographic processing steps.

Referring to step 100, a substrate is placed on an alignment tool capable of aligning the substrate. The substrate can be a semiconductor substrate, i.e., a substrate that includes at least one semiconductor layer. The substrate can be a bulk semiconductor substrate or a semiconductor-on-insulator (SOI) substrate as known in the art. In one embodiment, the substrate can be a semiconductor wafer having a diameter between 150 mm and 300 mm as known in the art. The substrate includes at least one level of lithographic pattern so that the locations of the dies therein can be measured in the alignment tool. The at least one level of lithographic pattern includes all cumulative lithographic patterns up to the time of the placement of the substrate in the alignment tool.

The alignment tool can be a unit in a lithographic tool as known in the art. The lithographic tool may also include additional units for applying a photoresist, lithographically exposing the photoresist, and/or developing the photoresist. Alternately, the alignment tool may be a standalone unit that is configured only to perform the operation of measuring locations of alignment marks on the substrate.

Referring to step 110, first alignment metrology is performed on the substrate. During the first alignment metrology, first alignment data 112 is generated by performing measurements on the substrate. Specifically, the locations of a set of alignment marks discretely distributed over a wafer are measured with respect to their expected locations (the design locations represented in the wafer layout of the particular mask containing the alignment marks) to comprise a set of mark placement errors. From the set of placement errors, various parameters that characterize the location and shape of each exposure field within the substrate can be determined by the application of models that continuously interpolate placement error among the discretely placed alignment marks.

Figure 7:
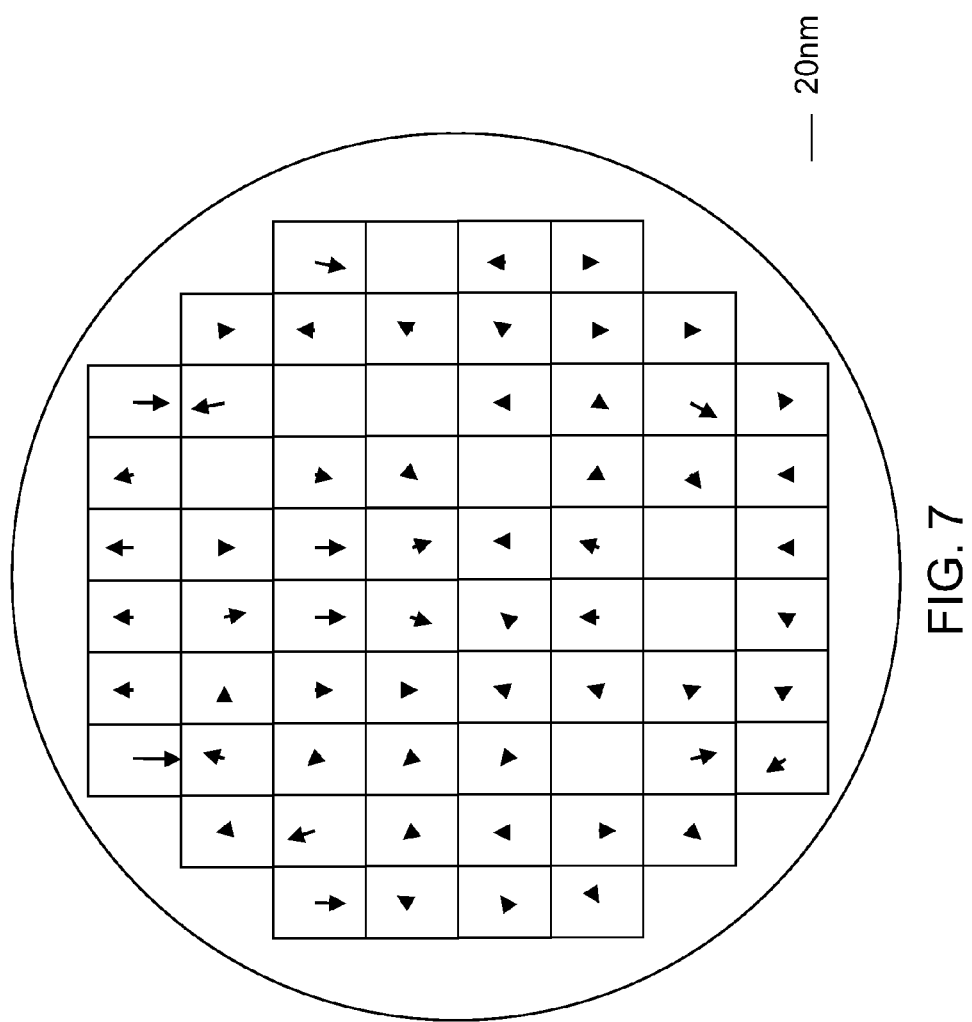
FIG. 7 is a wafer map illustrating, for each chip on the wafer, a difference vector between the first vector and the second vector.

The alignment tool can generate the first alignment data 112 by measuring locations of marks on the substrate in two different directions. For example, the first alignment data 112 can include data on a first translation distance of a mark along a first direction (such as the x-direction) from a predefined reference point of the substrate, and a second translation distance of a mark along a second direction (such as the y-direction) from the predefined reference point of the substrate. The first direction and the second direction are perpendicular to each other. Thus, the alignment data is typically comprised of a set of locations corresponding to two different perpendicular directions. A common representation of such data is called a vector map, as shown in FIG. 7, where the magnitude of the placement error in each direction determine the length and orientation of each vector.

The first alignment data 112 can be modeled to determine parameters that characterize the low order or "linear" modes of placement error variation over the wafer; namely: translation, scale or magnification, and rotation. The translation parameters (commonly referred to as "Tx" and "Ty") are the average placement errors in the x- and y-directions. The scale or magnification parameters (commonly referred to as "Mx" and "My") are the degree of fractional stretching or shrinking of the placement errors along the x- and y-directions. The rotation parameters (commonly referred to as "Θx" and "Θy") are the degree of fractional rotation of the placement errors along the x- and y-directions. The translation (Tx, Tx) and average rotation, Θavg=(Θx+Θy)/2, parameters typically do not correlate strongly to process effects since they are dependent on the mechanical positioning of the substrate with respect to the exposure tool. In most cases, therefore, it is advisable to subtract Tx, Ty and Θavg components from the alignment data.

Additionally, first alignment data 112 of sufficient density can be modeled to determine parameters that characterize higher order or "non-linear" modes of placement error variation over the wafer. Relative to the linear modes, high order modes of placement error are indicative of more localized deformations on the wafer.

Further, a polar coordinate system or any other coordinate system can be employed instead of a Cartesian coordinate system. The magnitude of the first translation distance and the second translation distance may, or may not be, proportional to the distance of the center of each die from the center of the substrate. Magnification in the x- and or y-direction is indicative of bowing of the substrate due to cumulative stress on the substrate at the time of the first alignment metrology. A difference between the x- and y-direction rotation (commonly referred to as "orthogonality") is indicative of the cumulative internal torsion of the substrate due to non-uniformity in processing that has accumulated on the substrate at the time of the first alignment metrology. Non-linear modes of placement error as a function of the distance of the alignment marks from the center of the substrate are indicative of non-uniformity in processing on the substrate that has accumulated on the substrate at the time of the first alignment metrology.

The first alignment data 112 can be electronically communicated to a database, which is herein referred to as an alignment database 400. The generation of the first alignment data 112 can be controlled by an automated system that includes at least one computing means such as a computer. The at least one communicating means is in communication with the alignment database 400, and can be configured to control the acquisition of the first alignment data 112 through measurements as well as the uploading of the first alignment data 112 to the alignment database 400.

Referring to step 120, if the alignment tool is a lithographic alignment tool, i.e., an alignment tool that is a unit of a lithographic system including lithographic exposure and development capability, the first alignment metrology is a lithographic metrology, i.e., a measurement step that is performed as part of a lithographic processing step at which a photoresist layer on the substrate is exposed and developed.

In one embodiment, a photoresist layer may be present on the substrate at step 110, either by application of the photoresist layer in a prior processing step or by application of the photoresist layer in a spin-coater in the lithographic system including the lithographic alignment tool. In this case, the photoresist layer may be lithographically exposed in an exposure unit within the lithographic system at step 120. The application and lithographic exposure of the photoresist layer is optional. In other words, the generation of the first alignment data 112 may be performed with, or without, a photoresist layer.

Referring to step 200, at least one processing step is performed on the substrate. The at least one processing step can include at least one non-lithographic processing step that introduces further deformation on the substrate after the first alignment data is generated. The additional deformation on the substrate can be introduced by addition of a new material to the substrate, removal of a material from the substrate, thermal processing that subjects the substrate to an elevated temperature or a cryogenic temperature before returning to room temperature, or any combination thereof. The addition of a new material can be performed by deposition of a new material on the substrate, for example, by chemical vapor deposition (CVD) or physical vapor deposition (PVD), by ion implantation, and/or by plasma doping, or by conversion of an existing material on the substrate into a new material, for example, by thermal oxidation, thermal nitridation, plasma oxidation, and/or plasma nitridation. Thermal processing that subjects the substrate to an elevated temperature or a cryogenic temperature includes, but is not limited to, a furnace anneal, a rapid thermal anneal (RTA), and cryogenic clean.

The at least one processing step can be a single processing step that is performed in a single processing tool, or can be a plurality of processing steps that are performed in a plurality of processing tools. Each of the at least one processing step can be any semiconductor processing step such as a material deposition step, a material conversion step, a dry etch step, a wet etch step, a planarization step, an ion implantation step, and a bonding step.

Processing history data 212 can be generated at each processing step among the at least one processing step of step 200, and can be electronically communicated to the alignment database 400 or a different database (not shown) that is in communication with the alignment database 400. The alignment database 400 can store the processing history data 212, which can include the list of processing tools employed to perform each of the at least one processing step performed at step 200 of the flow chart. The processing history data 212 can also include additional data such as processing parameters employed at one or more of the at least one processing step performed at step 200 of the flowchart.

Referring to step 300, the substrate is placed on an alignment tool capable of aligning the substrate. This alignment tool may be the same alignment tool employed for steps 100, 110, and optionally 120, or can be a different alignment tool. The alignment tool can be a unit in a lithographic tool as known in the art. The lithographic tool may also include additional units for applying a photoresist, lithographically exposing the photoresist, and/or developing the photoresist. Alternately, the alignment tool may be a standalone unit that is configured only to perform the operation of measuring locations of alignment marks on the substrate.

Referring to step 310, second alignment metrology is performed on the substrate. During the second alignment metrology, second alignment data 312 is generated by performing measurements on the substrate. Specifically, the locations of a set of alignment marks discretely distributed over a wafer are measured with respect to their expected locations (the design locations represented in the wafer layout of the particular mask containing the alignment marks) to comprise a set of mark placement errors. From the set of placement errors, various parameters that characterize the location and shape of each exposure field within the substrate can be determined by the application of models that continuously interpolate placement error among the discretely placed alignment marks.

The alignment tool generates second alignment data 312 that includes at least the same type of data as the first alignment data 112. Thus, if the first alignment data 112 includes data on locations of alignment marks on the substrate in two different directions, the second alignment data 312 includes data that is generated by measuring locations of the alignment marks on the substrate in the two different directions. If the first alignment data 112 can be modeled to determine the linear components of placement error (translation, magnification and rotation), the second alignment data can be modeled to determine the linear components of placement error (translation, magnification and rotation). If any other coordinate system is employed during generation of the first alignment data 112, the corresponding coordinate system can be employed during generation of the second alignment data 312 or during conversion of the measured raw data into the second alignment data 312.

Any change in the first and second translation distances between the first alignment data 112 and the second alignment data 312 can be indicative of additional wafer deformation that is caused, for example, by bowing, expansion or contraction, or torsion of the substrate due to the at least one processing step of step 200. Magnification change determined from the difference between the first and second alignment data indicates a change in the bowing of the substrate caused by a change in the stress on the substrate between the time of the first and second alignment metrology that is attributable to least one processing step of step 200. Orthogonality change determined from the difference between the first and second alignment data indicates a change in the torsion of the substrate between the time of the first and second alignment metrology that is attributable to least one processing step of step 200. Changes to higher order modes of placement error are indicative of non-uniformity in processing attributable to least one processing step of step 200.

The second alignment data 312 can be electronically communicated to the alignment database 400. The generation of the second alignment data 312 can be controlled by the automated system that includes at least one computing means such as a computer. The at least one communicating means is in communication with the alignment database 400, and can be configured to control the acquisition of the second alignment data 312 during the measurements as well as the uploading of the second alignment data 312 to the alignment database 400.

Referring to step 320, if the alignment tool is a lithographic alignment tool, the second alignment metrology is a lithographic metrology. In one embodiment, a photoresist layer may be present on the substrate at step 310, either by application of the photoresist layer in a prior processing step or by application of the photoresist layer in a spin-coater in the lithographic system including the lithographic alignment tool. In this case, the photoresist layer may be lithographically exposed in an exposure unit within the lithographic system at step 320. The application and lithographic exposure of the photoresist layer is optional. In other words, the generation of the second alignment data 312 may be performed with, or without, a photoresist layer.

The alignment database 400 stores the first alignment data 112 and the second alignment data 312. The alignment database 400 can also store the processing history data 212.

Referring to step 410, alignment data differential is calculated from the second alignment data 312 and the first alignment data 112 that are stored in the alignment database. At least one computing means, such as a computer or any other automated program in combination with hardware configured to run the automated program, may be employed to retrieve the measured first and second alignment data (112, 312) from the alignment database 400 and to calculate the alignment data differential. In some embodiments, the format of the measured first and second alignment data (112, 312) can be in a form that enables generation of the calculated alignment data differential by mathematical subtraction of the values for the first alignment data 112 from the corresponding values for the second alignment data 312. In other embodiments, the measured first and second alignment data (112, 312) can be mathematically manipulated, for example, by operating at least one computing means, to be converted into a format that enables generation of the calculated alignment data differential by mathematical subtraction of the values for the first alignment data 112 from the corresponding values for the second alignment data 312.

Referring to step 415, the calculated alignment data differential is analyzed to determine whether any abnormal data is present in the calculated alignment data differential, i.e., whether the calculated alignment data differential is outside a predetermined limit for statistical variation for the alignment data differential. The predetermined limit may be automatically calculated by an algorithm that runs on a computing means that performs statistical analysis on the data that accumulates in the alignment database 400. In one embodiment, at least one computing means can be employed, which is configured to determine whether the calculated alignment data differential for the substrate is within the predetermined limit for statistical variation therefor. Alternately, the predetermined limit may be manually set based on manufacturing needs, which can be established by correlating data on yield and/or reliability of semiconductor chips previously manufactured employing the same processes as the at least one processing step of step 200 or similar processing steps.

If there is no abnormal data in the calculated alignment data differential, step 490 can be performed, at which no change is made to the processing parameters for the process(es) among the at least one processing steps of step 200. In other words, steps 100, 110, 120, 200, 300, 310, and 320 can be performed on subsequent substrates without altering the process parameters for the process(es) among the at least one processing steps of step 200.

If there is any abnormal data in the calculated alignment data differential, step 425 is performed, at which a determination is made as to whether the abnormality in the calculated alignment data differential can be attributed to a specific processing step among the at least one processing steps at step 200. This determination can be made by an automated system that includes at least one computing means. The determination can be made, for example, by performing mathematical analysis on the calculated alignment data differential while utilizing data from a process model 500.

If identification of a mode of process variation is not possible at step 425, step 480 can be performed, at which wafer to wafer scanner diagnostics may be performed to determine whether any of the alignment tools employed at steps 110 and 310 is operating abnormally. A scanner model 600 that characterizes the normal operation of the alignment tools may be employed to compare whether the calculated alignment data differential points to any abnormal operation of the alignment tools employed at steps 110 and 310 for the substrate.

If a mode of process variation is identified at step 425, step 430 is performed, at which a processing tool is identified as the source of the abnormality in the calculated alignment data differential. The data from the process model 500 characterizes various modes of abnormality in the alignment data differential based on unique signatures present in the pattern of alignment data differential. Thus, by matching a pattern in the calculated alignment data differential for the substrate as calculated at step 410 with the process model, which includes various in-substrate patterns for each of the various modes of abnormality in the alignment data differential, a mode of process variation in a process tool employed to perform one of the at least one processing steps at step 200 can be identified. If the at least one processing step at step 200 is a plurality of processing steps that are performed by a plurality of processing tools, the identified processing step as the cause of the abnormality is one of the plurality of processing steps at step 200. Correspondingly, the processing tool identified as the cause of the abnormality in the calculated alignment data differential is selected from the plurality of processing tools employed at step 200.

Referring to step 440, operational procedure of the processing tool associated with the identified mode of process variation is altered, i.e., modified, based on a predetermined processing tool operation protocol. At least one computing means can be employed to generate the instruction employing the predetermined processing tool operation protocol, which can be encoded in the at least one computing means.

In one embodiment, the predetermined processing tool operation protocol may require determination of a new target for a process parameter for the identified processing tool based on the calculated alignment data differential and the process model 500. For example, the at least one computing means can be employed, which is configured to perform the step of determining a new target value for a process parameter for the processing tool based on the calculated alignment data differential and the process model.

In another embodiment, the predetermined processing tool operation protocol can be a statistical process control (SPC) procedure that employs input data generated from the calculated alignment data differential and the process model 500. Any known SPC procedures compatible with the processing tools of step 200 can be employed as the predetermined processing tool operational protocol. The input data may be generated by a computing means configured to run a program that performs the predetermined processing tool operation protocol.

Referring to step 200, the alteration to the operational procedure determined at step 440 is applied to the applicable processing tool, i.e., the processing tool associated with the identified mode of process variation. This alteration is applied to the processing tool upon determination of the alteration at step 440, for example, by electronic communication to the processing tool and at least one computing means that performs step 440. The alteration to the operational procedure is applied to substrates to be subsequently processed in the at least one processing tools of step 200.

Figure 2:
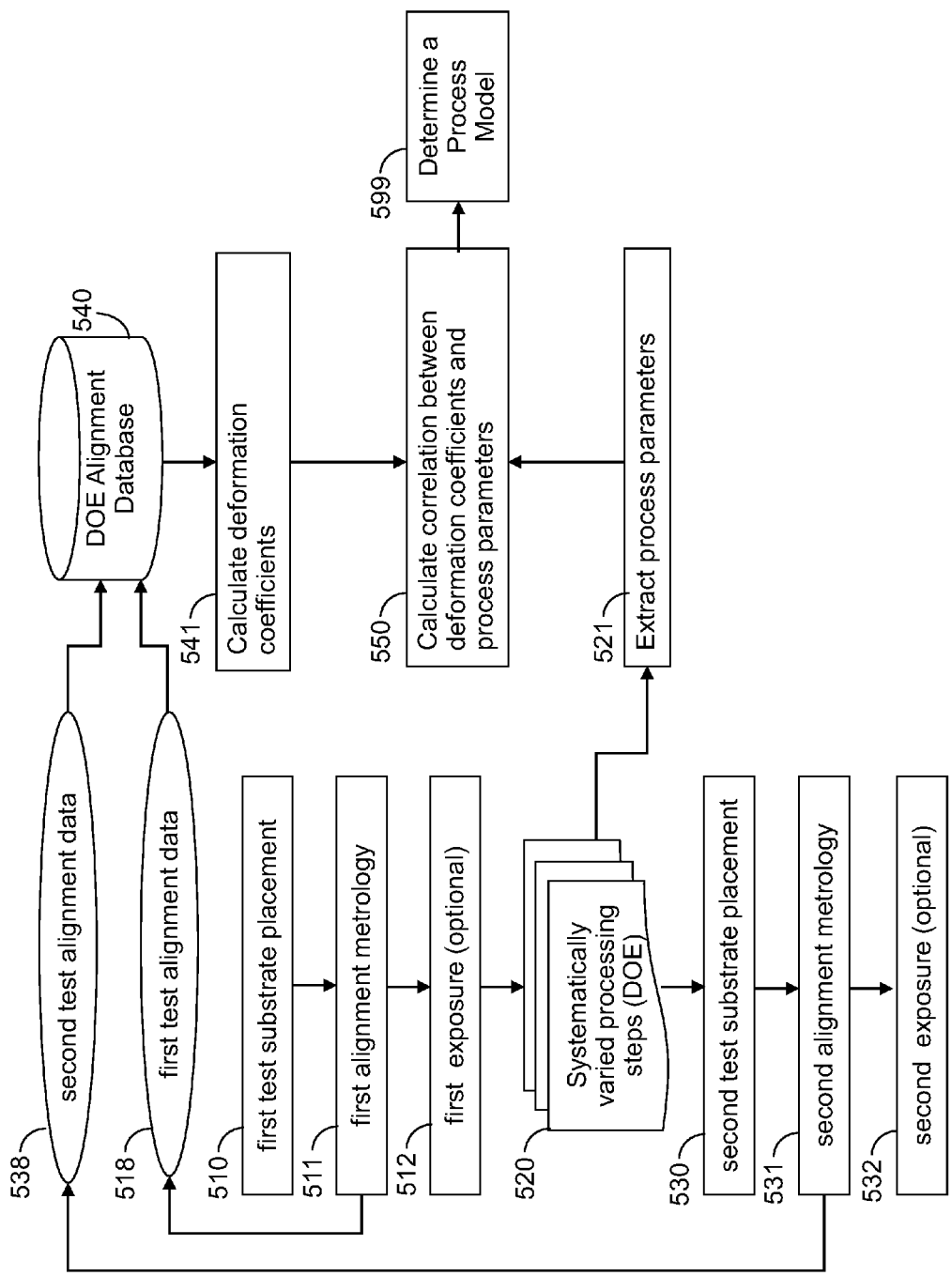
FIG. 2 is a flow chart that illustrates steps for generating a process model for a manufacturing process according to an embodiment of the present disclosure.

Referring to FIG. 2, another flow chart illustrates steps for generating a process model 500 for a manufacturing process according to an embodiment of the present disclosure. The steps of this flow chart can be employed for each processing step in the at least one processing step of step 200 in FIG. 1 so that the process model 500 includes data for various modes of abnormality for each of the processing steps at step 200 in FIG. 1.

The process model 500 correlates at least one mode of process variation within at least one processing step with a pattern in a corresponding alignment data differential between pre-processing alignment data and post-processing data. The pre-processing data is generated at a first alignment step prior to at least one processing step. The first alignment step can be, for example, step 511. The post-processing alignment data is generated at a second alignment step after the at least one processing step. The second alignment step can be, for example, step 531.

Referring to step 510, a set of test substrates is sequentially placed on an alignment tool capable of aligning each test substrate. The test substrates can be the same type as the substrate(s) employed in manufacturing, e.g., the substrate of FIG. 1. The test substrates can be bulk semiconductor substrates or semiconductor-on-insulator (SOI) substrates as known in the art. Each test substrate includes at least one level of lithographic pattern so that the locations of the dies therein can be measured in the alignment tool. The alignment tool can be the same as one of the alignment tools in FIG. 1.

Referring to step 511, first alignment metrology is performed on the set of test substrates. During the first alignment metrology, first test alignment data 518 is generated by performing measurements on the substrate. Specifically, the same type of measurements is performed as the measurements that generate the first alignment data 112 in FIG. 1. Thus, the coordinates of the various corners of each die can be measured to determine the location of a predetermined corner of the die, the distortion of the die, and/or the deviation of the size of the die from an ideal die size.

Specifically, the alignment tool generates first test alignment data 518 that includes at least the same type of data as the first alignment data 112. Thus, if the first alignment data 112 includes data on locations of dies on the substrate in two different directions, the first test alignment data 518 includes data that is generated by measuring locations of the dies on the test substrates in the two different directions. If the first alignment data 112 includes data on rotations of predefined directions in dies, the first test alignment data 518 includes data that is generated by measuring rotations of the predefined directions in the dies in the test substrates. If the first alignment data 112 includes data on a change in lithographic image magnification that is required to register a new image on preexisting alignment marks on the substrate from standard magnification, the first test alignment data 518 includes data that is generated by measuring the same type of change in lithographic image magnification that is required to print a new image on the test substrates or to register a new image on preexisting alignment marks on the test substrates as measured from a standard magnification. If any other coordinate system is employed during generation of the first alignment data 112, the corresponding coordinate system can be employed during generation of the first test alignment data 518 or during conversion of the measured raw data into the first test alignment data 518.

The first test alignment data 518 can be electronically communicated to a database, which is herein referred to as a design of experiments (DOE) alignment database 540. The generation of the first test alignment data 518 can be controlled by an automated system that includes at least one computing means such as a computer. The at least one communicating means is in communication with the DOE alignment database 540, and can be configured to control the acquisition of the first test alignment data 518 through measurements as well as the uploading of the first test alignment data 518 to the DOE alignment database 540.

Referring to step 512, lithographic exposure may be performed on the set of test substrates as needed. Specifically, if a photoresist layer is present at step 110 in FIG. 1 and if lithographic exposure is performed on a substrate at step 120 in FIG. 1, a photoresist layer may be provided at step 511 and is lithographically exposed at step 512. The application and lithographic exposure of the photoresist layer is optional, and depends on whether corresponding processes are performed on the substrate in the flow chart of FIG. 1. In other words, the generation of the first test alignment data 518 may be performed with, or without, a photoresist layer depending on embodiments.

Referring to step 520, processing steps that are systematically varied from a normal flow of at least one processing step are performed on the set of test substrates. The set of at least one processing step performed at step 520 is identical to the set of at least one processing step performed at step 200 in FIG. 1 except that a variation is introduced to one or more processing parameters in a processing step for the test substrates at step 520. Specifically, during the processing of each test substrate, at least one process parameter is set to a different value on a processing step among the at least one processing step employed in the flow chart of FIG. 1. Design of experiments (DOE) may be employed to plan the selection of the different values for the at least one process parameter during for the processing of the test substrates. Thus, the test substrates are processed with different sets of test process parameters inducing different degrees and/or modes of process variation among the modes of process variation that each processing tool employed at step 200 in FIG. 1 can have.

Referring to step 530, each test substrate is sequentially placed on an alignment tool capable of aligning the test substrate. This alignment tool may be the same alignment tool employed for steps 100 and 110, for steps 300 and 310, or for steps 510 and 511, or can be a different alignment tool provided that the same type of alignment data can be generated as in step 511.

Referring to step 531, second alignment metrology is performed on the set of test substrates. During the second alignment metrology, second test alignment data 538 is generated by performing measurements on the set of test substrates. Specifically, the locations of a set of alignment marks discretely distributed over each substrate are measured with respect to their expected locations (the design locations represented in the layout of the particular mask containing the alignment marks) to comprise a set of mark placement errors. From the set of placement errors, various parameters that characterize the location and shape of each exposure field within the substrate can be determined by the application of models that continuously interpolate placement error among the discretely placed alignment marks.

The alignment tool generates second test alignment data 538 that includes at least the same type of data as the first test alignment data 518. Thus, if the first test alignment data 518 includes data on locations of the alignment marks on the substrate in two different directions, the second test alignment data 538 includes data that is generated by measuring locations of the alignment marks on the substrate in the two different directions. If the first test alignment data 518 includes data on rotations of predefined directions in dies, the second test alignment data 538 includes data that is generated by measuring, the alignment tool can generate the second test alignment data 538 by measuring rotations of the predefined directions in the dies. If the first test alignment data 518 includes data on a change in lithographic image magnification that is required to register a new image on preexisting alignment marks on the substrate from standard magnification, the second test alignment data 538 includes data that is generated by measuring the same type of change in lithographic image magnification that is required to register a new image on preexisting alignment marks on the substrate from standard magnification. If any other coordinate system is employed during generation of the first test alignment data 518, the corresponding coordinate system can be employed during generation of the second test alignment data 538 or during conversion of the measured raw data into the second test alignment data 538.

The change in the first and second translation distances between the first test alignment data 518 and the second test alignment data 538 is indicative of additional wafer deformation that is caused, for example, by bowing or local expansion or contraction of the substrate due to the at least one processing step of step 520 including at least one process variation.

Non-uniformity in the change of the first and second translation distances can be indicative of non-uniformity in the bowing or local expansion or contraction caused by the process(es) that is/are performed at the at least one processing step of step 520. Magnification change determined from the difference between the first 518 and second 538 test alignment data indicates a change in the bowing of the substrate caused by a change in the stress on the substrate between the time of the first 511 and second 531 test alignment metrology that is attributable to least one processing step of step 520. Orthogonality change determined from the difference between the first 518 and second 538 test alignment data indicates a change in the torsion of the substrate between the first 511 and second 531 test alignment metrology that is attributable to least one processing step of step 520. Changes to higher order modes of placement error are indicative of non-uniformity in processing attributable to least one processing step of step 520.

The second test alignment data 538 can be electronically communicated to the DOE alignment database 540. The generation of the second test alignment data 538 can be controlled by the automated system, if present, that includes at least one computing means such as a computer. The at least one communicating means is in communication with the DOE alignment database 540, and can be configured to control the acquisition of the second test alignment data 538 during the measurements as well as the uploading of the second test alignment data 538 to the DOE alignment database 540.

Referring to step 532, lithographic exposure may be performed on the set of test substrates as needed. Specifically, if a photoresist layer is present at step 310 in FIG. 1 and if lithographic exposure is performed on a substrate at step 320 in FIG. 1, a photoresist layer may be provided at step 531 and is lithographically exposed at step 532.

The first test alignment data 518 and the second test alignment data 538 are stored in the DOE alignment database 540. Referring to step 541, the first test alignment data 518 and the second test alignment data 538 are subsequently utilized to calculate alignment data differential for each test substrate. The pattern in the alignment data differential in each test substrate can be analyzed to determine deformation coefficients. The deformation coefficients characterize the various modes of deformation that each variation in the process parameter at step 520 introduces on the set of test substrates. The deformation coefficients can be calculated by employing any mathematical algorithm known in the art such as least root mean square method. The calculation of the deformation coefficients can be automated, for example, by employing a computing means.

Referring to step 521, process parameters employed in the systematically varied processing steps under design of experiments at step 520 are extracted and transmitted to a computing means, which can be a computer.

Referring to step 550, the process parameters employed in step 520 and the calculated deformation coefficients for the test substrates are correlated. The correlation can be performed employing any mathematical algorithm known in the art for determining correlation between multiple variables and multiple measured datapoints.

Referring to step 599, the correlation can be employed to determine a process model 500, which quantitatively correlates each identified pattern of variations in the alignment data differential as calculated at step 541 with a variation in a process parameter for the at least one processing steps of step 520. In one embodiment, the process model 500 is generated by calculating correlation between each of the different sets of the test process parameters and corresponding coefficients for a series of polynomials that are orthogonal to one another and approximate an alignment data differential in a corresponding test substrate. As discussed above, the at least one processing step of step 520 performs the same set of at least one processing step of step 200 in FIG. 1.

Figure 3A:
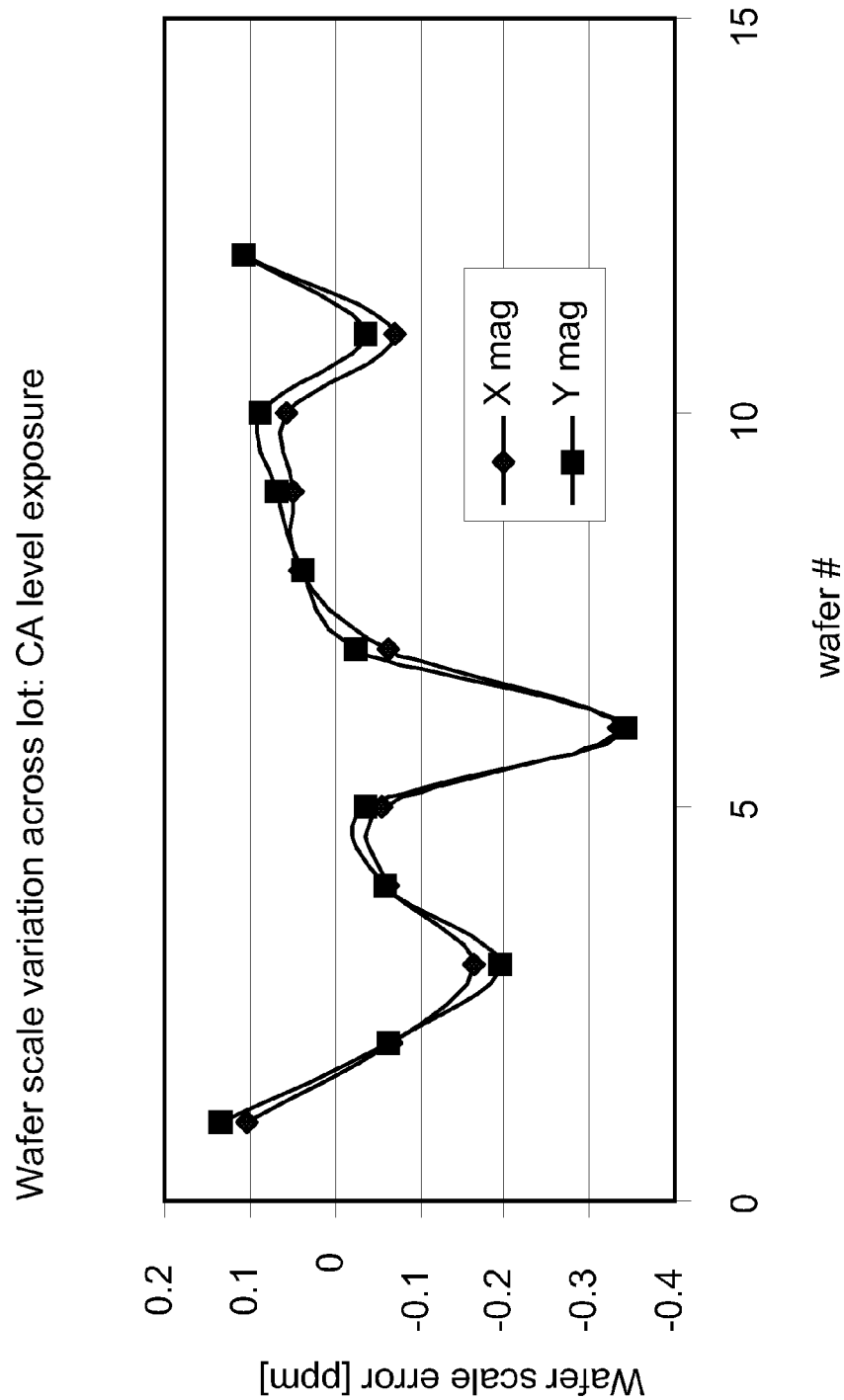
FIG. 3A is graph of the average X-magnification and the average Y-magnification for wafers in a lot at a lithographic step for CA level lithography.
Figure 3B:
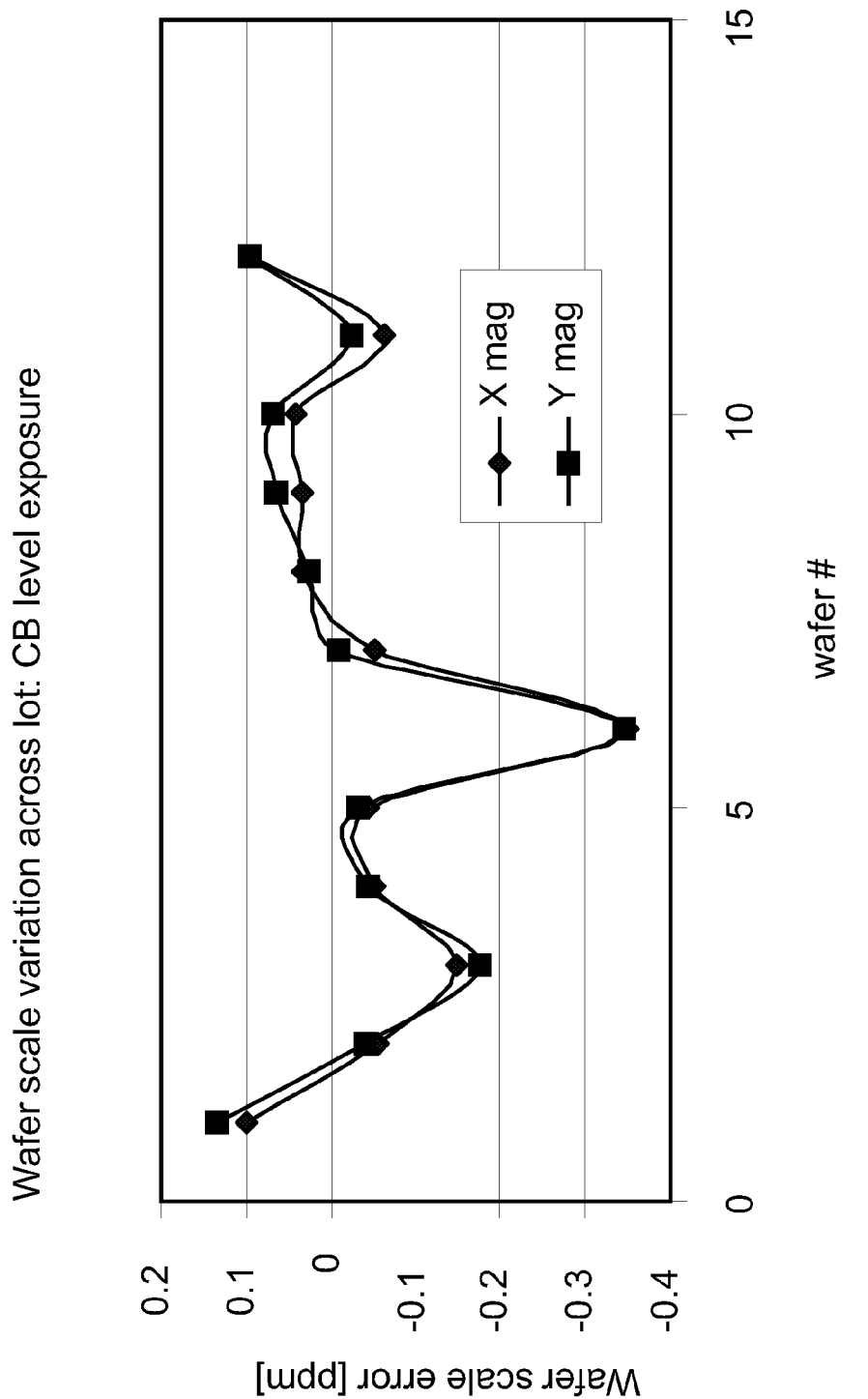
FIG. 3B is graph of the average X-magnification and the average Y-magnification for wafers in the lot at a lithographic step for CB level lithography.
Figure 3C:
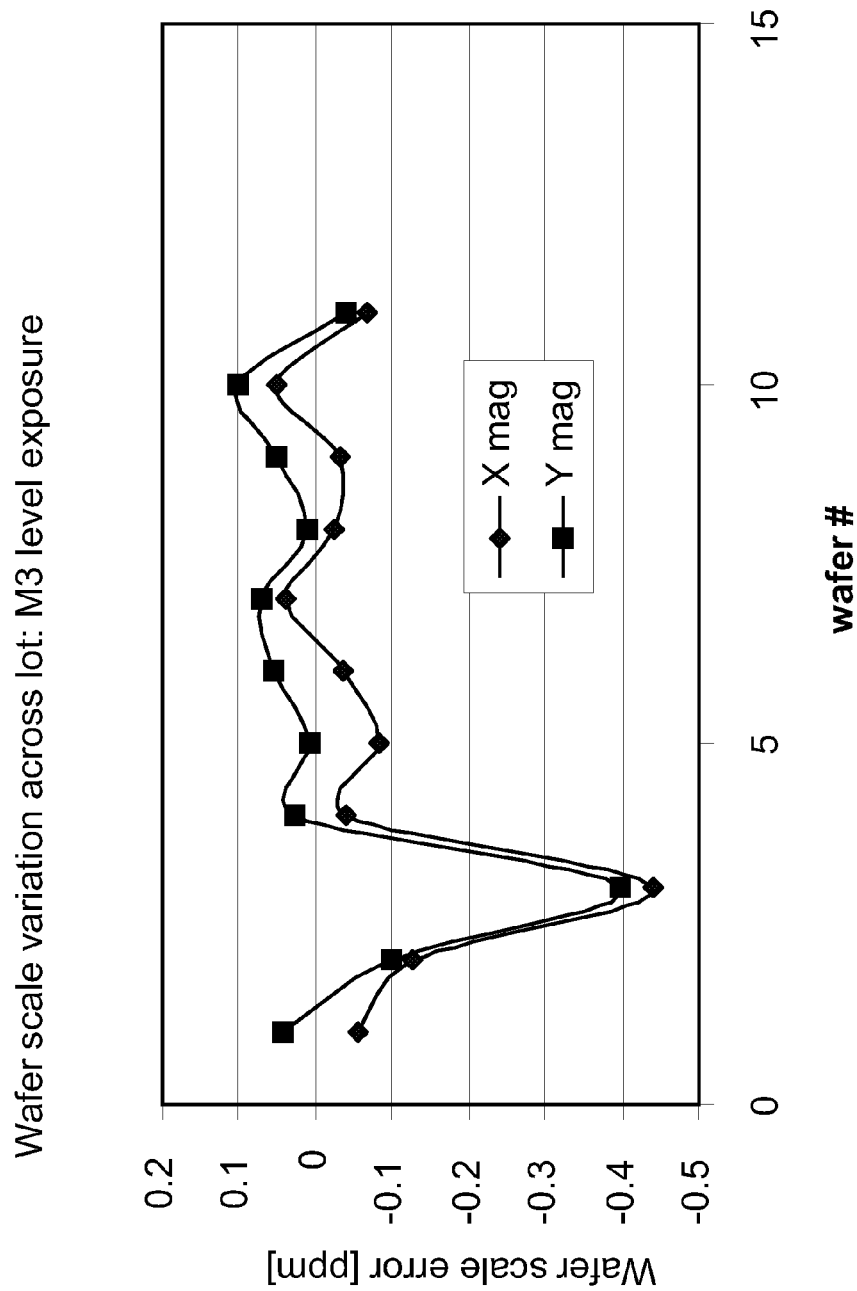
FIG. 3C is graph of the average X-magnification and the average Y-magnification for wafers in the lot at a lithographic step for M3 level lithography.

Referring to FIGS. 3A-3C, the average X-magnification and the average Y-magnification for wafers in a lot are shown at various processing steps in an illustration of the changes in the measured alignment data at various alignment steps.

The data in FIG. 3A is alignment data generated at a lithographic step for CA level lithography. The CA level is a lithographic level that prints gate contact via holes to gate conductors. The gate contact via holes are formed in a contact-level dielectric material layer that is deposited directly on the top surface of a semiconductor substrate. The data in FIG. 3B is alignment data generated at a lithographic step for CB level lithography. The CB level is a lithographic level that prints substrate contact via holes to a semiconductor substrate. The substrate contact via holes are formed in the contact-level dielectric material layer. The wafer to wafer variation in the average X-magnification and the average Y-magnification in FIG. 3A tracks the corresponding wafer to wafer variation in the average X-magnification and the average Y-magnification in FIG. 3B. In this case, only a CA level lithographic exposure, an etch process for forming the gate contact via holes, and an ashing process for a remaining portion of a photoresist layer after the etch process are present between the CA level lithography and the CB level lithography. Thus, the absence of signification change in the he average X-magnification and the average Y-magnification for wafers between FIG. 3A and FIG. 3B confirms that the processing steps between the CA level lithography and the CB level lithography did not introduce significant changes in substrate deformation.

However, the significant change in the average X-magnification and the average Y-magnification is observed for the third wafer and the sixth wafer between the CB level data shown in FIG. 3B and the M3 level data shown in FIG. 3C. Thus, at least one of the processing steps between the CB level lithography and the M3 level lithography introduced significant changes in the average X-magnification and the average Y-magnification, for example, through wafer bowing, expansion, and/or contraction. By analyzing the pattern in the alignment data differential in the third wafer and in the sixth wafer, as measured at the alignment step during the CB lithography and at the alignment step during the M3 lithography, tools that introduced the abnormal measured alignment data differential in the third and sixth wafers can be identified.

Figure 4:
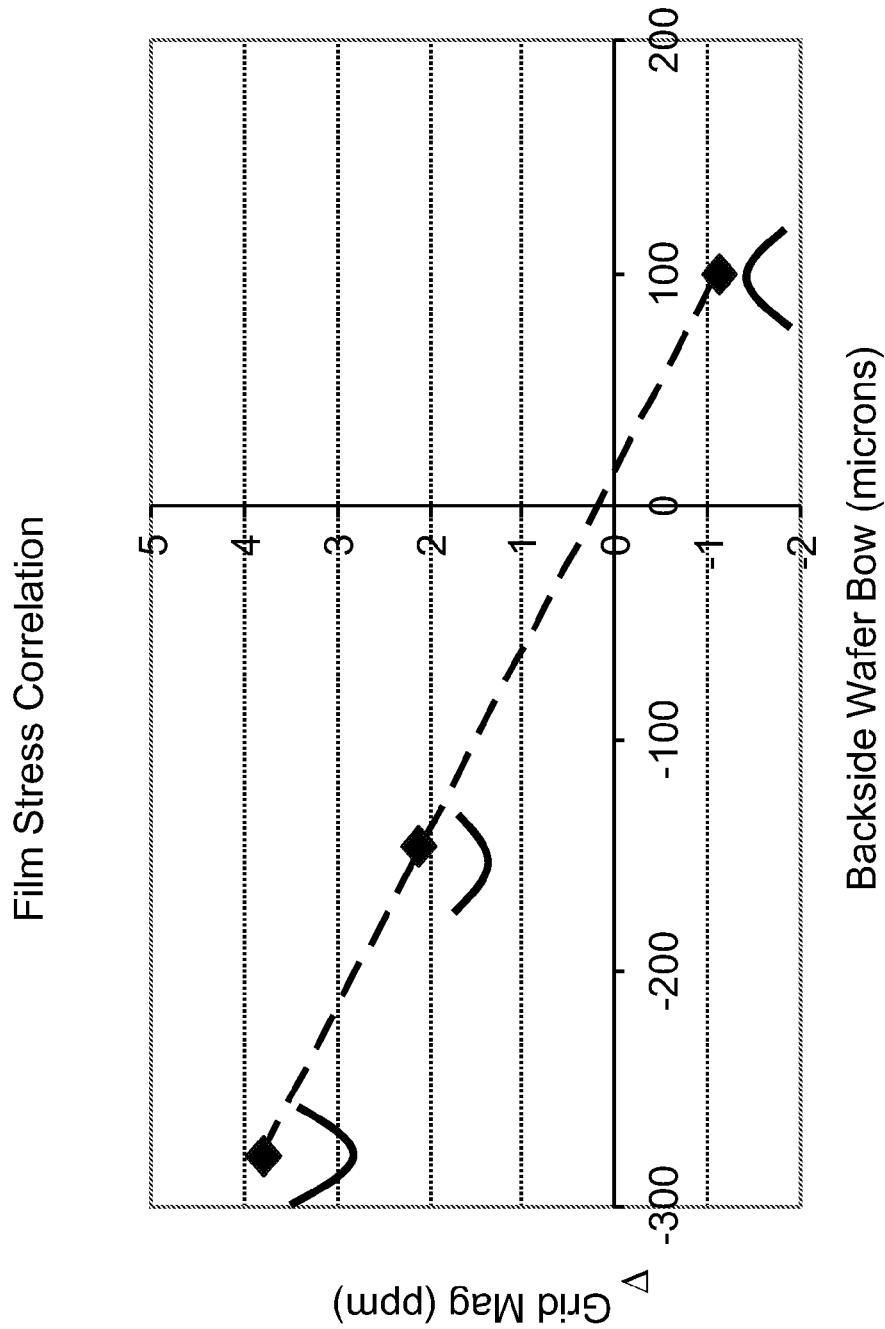
FIG. 4 is a graph illustrating a linear relationship between backside wafer bow and grid magnification change.

Referring to FIG. 4, a graph illustrates a mechanism by which a processing tool that introduces abnormal measured alignment data differential can be identified. For example, if a stress-generating liner deposition tool is known to provide a different degree of wafer bowing (as schematically illustrated by three horizontal cross-sectional views of a substrate under each datapoints), the process parameter can be correlated with the measured differential grid magnification, i.e., the change in the average X-magnification and/or in the average Y-magnification. Specifically, the film stress can be indirectly correlated to the differential grid magnification by first establishing a linear relationship between backside wafer bow and grid magnification change as illustrated in FIG. 4, and then by establishing a linear or non-linear relationship between the wafer bow and film stress by additional characterization of test substrates.

Figure 5:
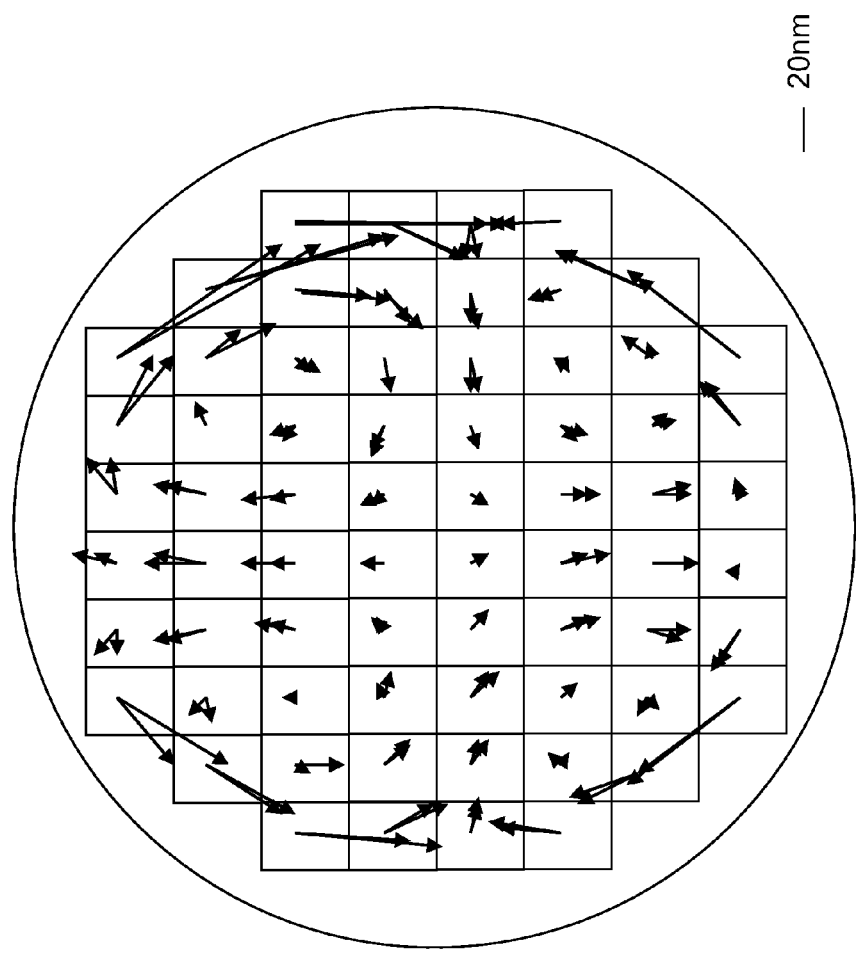
FIG. 5 is a wafer map illustrating, for each chip on a wafer, a first vector representing the measured x displacement and the measured y displacement of the alignment marks from their positions at a previous alignment step and a second vector representing a corresponding vector representing a mathematically approximated displacement vector pattern generated by employing up to third degree polynomials.

In some embodiments, other pattern dependent statistically-derived quantities other than an average across a substrate can also be employed to correlate measured alignment data differential with a process parameter in a processing tool. Referring to FIG. 5, a wafer map illustrates, for each chip on a wafer, a first vector and a second vector (which are not distinguished in FIG. 5). Each first vector represents the measured x displacement and the measured y displacement of the alignment marks from their positions at a previous alignment step. Each second vector represents a corresponding vector representing a mathematically approximated displacement vector pattern generated by employing up to third degree polynomials. Specifically, the second vectors are generated using Zernike polynomials up to the third order. The magnitude of each vector is scaled relative to a legend representing the distance corresponding to 20 nm.

In one embodiment, the process model 500 can be generated by calculating correlation between each of the different sets of the test process parameters and corresponding coefficients for a series of polynomials that are orthogonal to one another and approximate an alignment data differential in a corresponding test substrate. Such polynomials include, for example, Zernike polynomials, Bessel polynomials, and any other set of orthogonal polynomials that are orthogonal to one another on the shape of the substrate on which the at least one processing steps of step 200 is performed. A set of polynomials are orthogonal on the shape of an element if that set of polynomials is defined only on the area of the shape of the element and each polynomial within the set is orthogonal to all other polynomials within the set.

Figure 6:
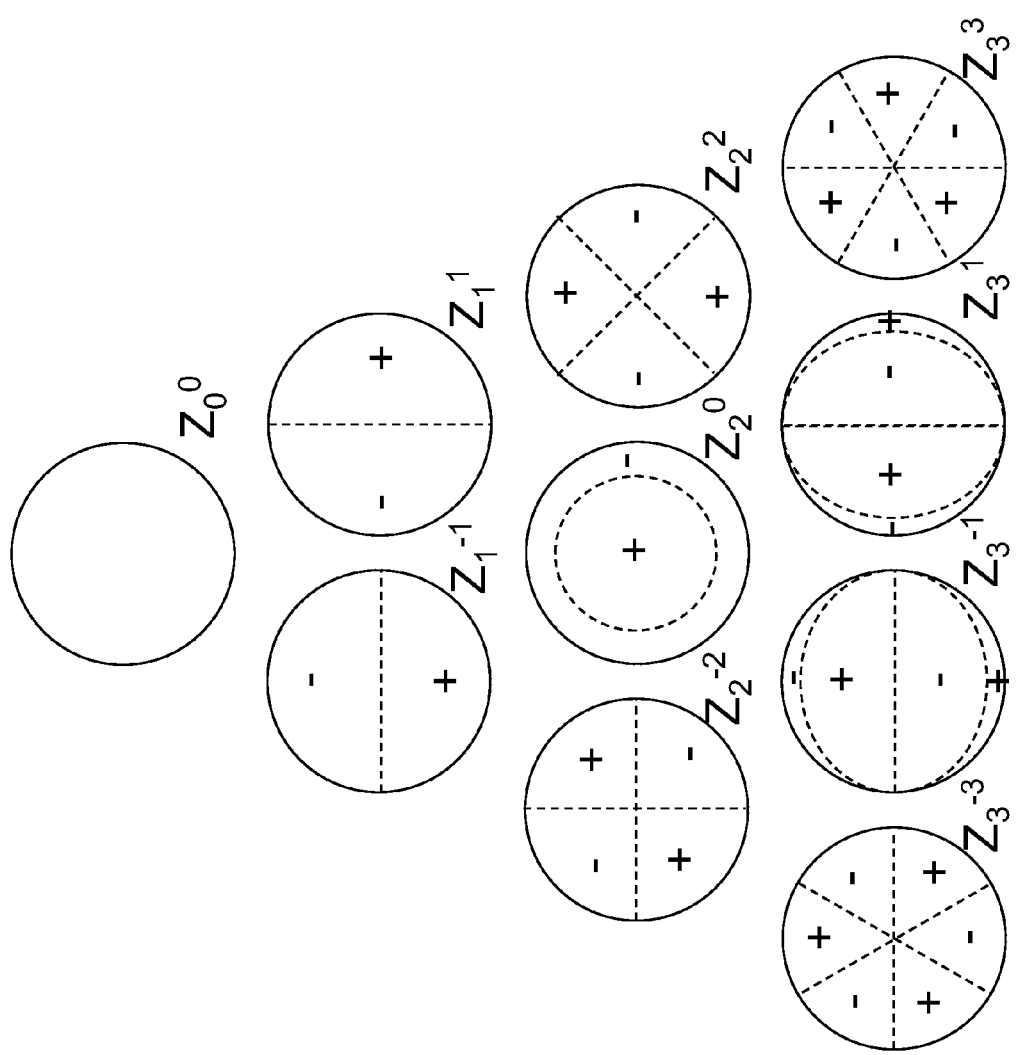
FIG. 6 is an illustration of Zernike polynomials between the zeroth degree and the third degree.

Referring to FIG. 6, an example is shown of polynomials that can be employed as a set of orthogonal functions that can be used to approximate the alignment data differential. Specifically, Zernike polynomials of the zeroth order, the first order, the second order, and the third order are shown from top to bottom.

Referring to FIG. 7, the difference vector between each pair of the first vector and the second vector in the dies in FIG. 5 is plotted in a wafer map.

In general, underlying mechanical distortion problems are governed by a biharmonic equation, and a form of factored bounded biharmonic functions are typically used in polar coordinates. Spherical harmonics in the form of Legendre polynomials are also employed to express the angular part. The radial part is often expressed through the Bessel functions. For instance, circular membrane vibration modes are described in terms of Bessel functions. If the base functions are appropriately chosen, the coefficients for the orthogonal polynomials decay rapidly with an increase in the order of the polynomials.

Thus, the calculated alignment data differential as generated at step 410 in FIG. 1 can be approximated with a set of orthogonal polynomials, and each calculated alignment data differential can be characterized with a set of coefficients, which is herein referred to as a set of deformation coefficients. Correspondingly, the determination of whether any abnormal alignment data differential exists at step 415 in FIG. 1 can be made by performing mathematical analysis on the set of deformation coefficients derived from the calculated alignment data differential generated at step 410 of FIG. 1. For example, the magnitude of each deformation coefficients can be compared with a predefined range for the corresponding deformation coefficient. If the magnitude of the deformation coefficient is within the predefined range, the calculated alignment data can be deemed normal, and if the magnitude of the deformation coefficient is outside the predefined range, the calculated alignment data can be deemed abnormal.

Further, the determination on whether any observed abnormality in the calculated alignment data differential can be attributable to any processing step at step 425 of FIG. 1 can be made by performing mathematical analysis on the set of deformation coefficients derived from the calculated alignment data differential generated at step 410 of FIG. 1. For example, the pattern in the calculated deformation coefficients can be compared with multiple predefined patterns representing a mode of process variation that occurs in the processing tools employed at step 200. The predefined patterns can be encoded in the process model 500. If the pattern in the calculated deformation coefficients matches one of the patterns for process variations as encoded in the process model, the cause of the observed abnormal differential data differential can be attributed to the corresponding process tool, and an appropriate adjustment can be made to the operational procedure for the process tool at step 440 in FIG. 1.

Further, the determination of deformation coefficients as performed at step 541 in FIG. 2 can employ the same set of orthogonal polynomials. Thus, the process model 500 can be encoded employing various sets of deformation coefficients representing the various modes of process variations that occur in the processing tools employed in step 520 of FIG. 2, which are the same processing tools employed in step 200 in FIG. 1.

In general, at step 410 in FIG. 1, coefficients are generated for a series of polynomials that are orthogonal to one another on the shape of the substrate or the test substrates. The series of polynomials, with corresponding coefficients, approximate the pattern in the calculated alignment data differential. In one embodiment, at least one computing means is configured to perform these steps.

Further, at step 541 in FIG. 2, coefficients for at least another series of the polynomials are generated. The at least another series of polynomials, with corresponding coefficients, approximate each of at least one mode of process variation introduced under the design of experiments at step 520. In this case, at step 430, the mode of process variation can be identified by selecting a mode of process variation that provides greatest statistical correlation between corresponding coefficients for same polynomials between the series of the at least another series. In one embodiment, at least one computing means is configured to perform these steps.

Figure 8:
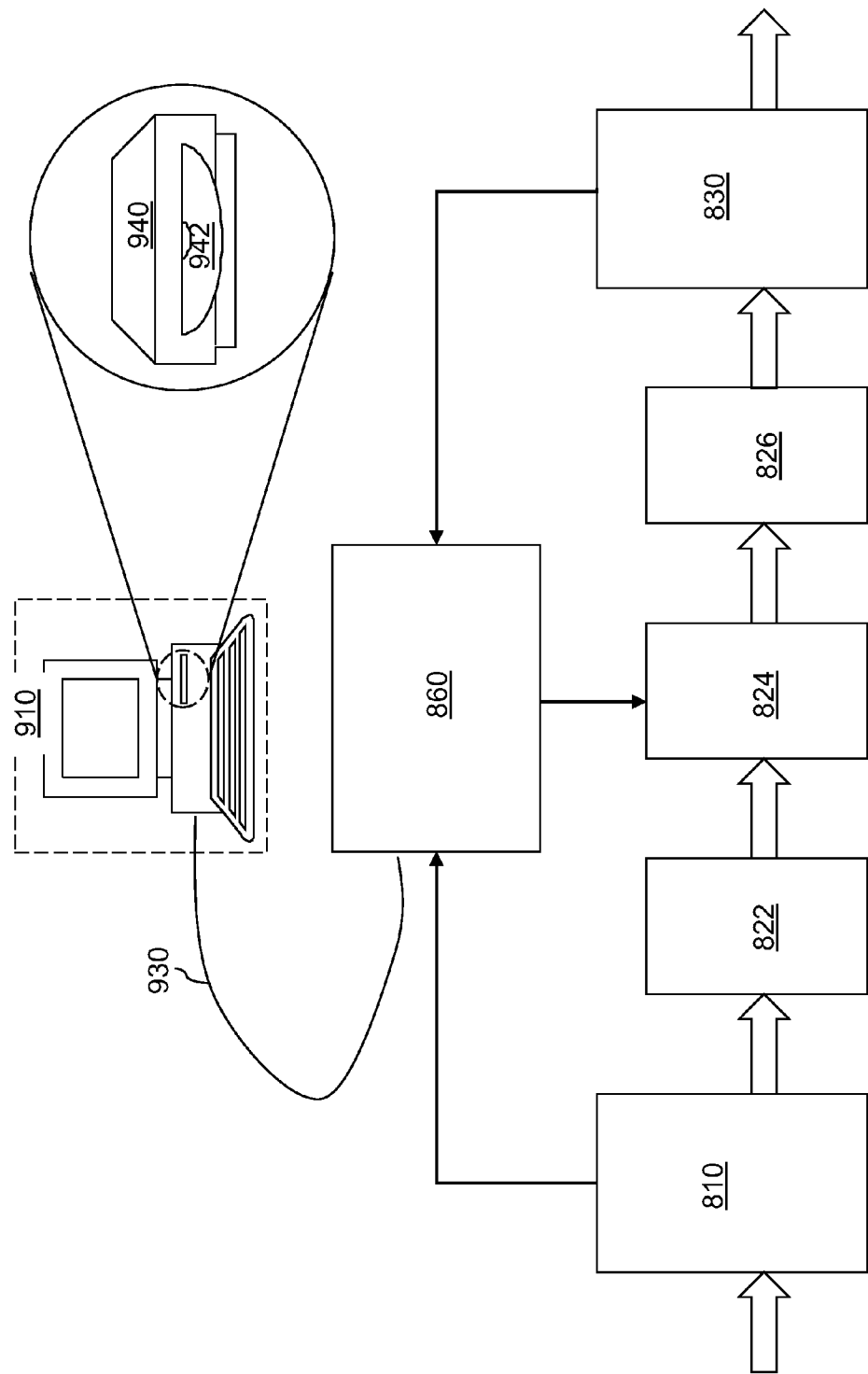
FIG. 8 is a schematic representation of a system for alignment data based process control according to an embodiment of the present disclosure.

FIG. 8 illustrates a system for alignment data based process control according to an embodiment of the present disclosure. The system can be employed to control controlling a manufacturing sequence by directing a hardware flow (i.e., flow of substrates) and data flow. The system includes at least one processing step, which is performed by at least one processing tool. The at least one processing tool are represented as a first processing tool 822, a second processing tool 824, and a third processing tool 826. Each of the at least one processing tool (822, 824, 826) is configured to perform at least one processing step, which correspond to the at least one processing step of step 200 in FIG. 1 or step 520 in FIG. 2. The system also includes at least one computing means 910, which are represented as a computer including at least one memory device. The memory device can be, but is not limited to, a hard disk, a USB drive, a tape drive, and a disk writing device 940 configured to store data on a disk 942. For example, the disk writing device 940 can be a CD ROM writing drive or a DVD ROM writing device, and the disk can be a CD ROM disk or a DVD ROM disk.

A data storage device 860 is also provided, which can be a standalone device or a device incorporated into the at least one computing means 910. If the data storage device 860 is a standalone device, the data storage device 860 is in electronic communication with the at least one computing means 910 via a data cable 930 or via wireless communication.

The system further includes at least one alignment tool, which is represented as a first alignment tool 810 that can perform steps 100, 110, and 120 in FIG. 1 and/or steps 510, 511, 512 in FIG. 2 and a second alignment tool 830 that can perform steps 300, 310, and 320 in FIG. 1 and/or steps 530, 531, and 532 in FIG. 2. The first alignment tool 810 and the second alignment tool 830 can be different tools or the same tool. The hardware, e.g., the substrate in FIG. 1 or the set of test substrates in FIG. 2, is directed along the direction of the block arrows, i.e., sequentially to the first alignment tool 810, to the first processing tool 822, to the second processing tool 824, to the third processing tool 826, to the second alignment tool 830, and subsequent processing tools (not shown). The data and control instructions flow in the direction of the arrow and between the at least one computing means 910 and the data storage device 860, which can function as the hardware performing the function of the alignment database 400 and/or the function of the DOE alignment database 540.

The at least one computing means 910 can be configured to perform the steps of:
 (a) storing a process model that correlates at least one mode of process variation within the at least one processing step of the at least one processing tool (822, 824, 826) with a pattern in alignment data differential between pre-processing alignment data and post-processing data, wherein the pre-processing data is generated at a first lithographic alignment step prior to the at least one processing step employing the first alignment tool 810, and the post-processing alignment data is generated at a second lithographic alignment step after the at least one processing step employing the second alignment tool 830;
 (b) receiving first alignment data on a substrate that is measured by one of the at least one lithographic alignment tool, e.g., the first alignment tool 810, at the first lithographic alignment step;
 (c) receiving second alignment data on the substrate that is measured by the one or another of the at least one lithographic alignment tool, e.g., the second alignment tool 830, at the second lithographic alignment step;
 (d) calculating alignment data differential for the substrate by subtracting the first alignment data from the second alignment data;
 (e) identifying a mode of process variation by matching a pattern in the calculated alignment data differential for the substrate with the process model; and
 (f) generating instructions for altering operational procedure of a processing tool among the at least one processing tool, wherein the processing tool is associated with the identified mode of process variation.

The at least one computing means 910 houses a processor, memory and other systems components (not shown expressly in the drawing) that implement a general purpose processing system, or computer that may execute a computer program product. The computer program product may comprise media, for example a compact storage medium such as a compact disc, which may be read by the processing unit through a disc drive, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit, as mentioned, or may be located on a remote system such as a server (not shown), coupled to the processing unit, via a network interface such as an Ethernet interface. A monitor, a mouse, a keyboard, and any other human interface device can be coupled to the processing unit, to provide user interaction. A scanner (not shown) and/or a printer (not shown) may be provided for document input and output.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. A method of controlling a manufacturing sequence including at least one processing step, said method comprising:
 providing a process model that correlates at least one mode of process variation within at least one processing step with a pattern in a corresponding alignment data differential between pre-processing alignment data and post-processing data, wherein said pre-processing data is generated at a first alignment step prior to said at least one processing step, and said post-processing alignment data is generated at a second alignment step after said at least one processing step;
 generating first alignment data on a substrate at said first alignment step by measuring a first set of mark placement errors as calculated by differences between positions of physical structures for alignment marks located at multiple dies with respect to a single point, said single point being located on said substrate and not included within said multiple dies, and corresponding expected positions for said physical structures for said alignment marks with respect to said single point, said corresponding expected positions derived from design locations within a lithographic mask;
 performing said at least one processing step on said substrate after said first alignment step;
 generating second alignment data on said substrate at said second alignment step by measuring a second set of mark placement errors as calculated by differences between positions of said physical structures for said alignment marks located at said multiple dies with respect to said single point located on said substrate and corresponding expected positions for said physical structures for said alignment marks with respect to said single point;

determining a set of deformation coefficients representing magnitudes of modes of deformation that are present in a change in substrate deformation between measurement of said first alignment data and measurement of said second alignment data by calculating differences in corresponding data points between said first alignment data and said second alignment data;

identifying a mode of process variation by matching a pattern in said set of deformation coefficients for said substrate with said process model; and altering operational procedure of a processing tool associated with said identified mode of process variation based on a predetermined processing tool operation protocol.

2. The method of claim 1, wherein a photoresist layer is present on said substrate at said first alignment step.

3. The method of claim 1, wherein a photoresist layer is present on said substrate at said second alignment step.

4. The method of claim 1, further comprising:
storing said measured first alignment data in an alignment database;
storing said measured second alignment data in said alignment database; and
operating a computing means to retrieve said measured first and second alignment data from said alignment database and to determine said set of deformation coefficients.

5. The method of claim 1, further comprising determining whether said set of deformation coefficients for said substrate is within a predetermined limit for statistical variation therefor.

6. The method of claim 1, further comprising generating coefficients for a series of polynomials that are orthogonal to one another on a shape of said substrate, wherein said series of polynomials with corresponding coefficients approximate said pattern in said set of deformation coefficients.

7. The method of claim 6, further comprising generating coefficients for at least another series of said polynomials that approximate each of at least one mode of process variation, wherein said mode of process variation is identified by selecting a mode of process variation that provides greatest statistical correlation between corresponding coefficients for same polynomials between said series of said at least another series.

8. The method of claim 1, further comprising determining a new target for a process parameter for said processing tool based on said set of deformation coefficients and said process model.

9. The method of claim 1, wherein said predetermined processing tool operation protocol is a statistical process control procedure that employs input data generated from said set of deformation coefficients and said process model.

10. The method of claim 9, wherein said input data is generated by a computing means configured to run a program that performs said predetermined processing tool operation protocol.

11. The method of claim 1, wherein said process model is generated employing design or experiments (DOE) in which test substrates are processed with different sets of test process parameters inducing different degrees or modes of process variation among said at least one mode of process variation.

12. The method of claim 11, wherein said process model is generated by calculating correlation between each of said different sets of said test process parameters and corresponding coefficients for a series of polynomials that are orthogonal to one another and approximate an alignment data differential in a corresponding test substrate.

13. The method of claim 1, wherein said at least one processing step is a plurality of processing steps that are performed by a plurality of processing tools, and said processing tool is selected from said plurality of processing tools.

14. The method of claim 1, wherein said first alignment data and said second alignment data include locations of dies on said substrate in two orthogonal directions.

15. The method of claim 1, wherein said first alignment data and said second alignment data include a change in lithographic image magnification that is required to register a new image on preexisting alignment marks on said substrate from standard magnification.

16. The method of claim 1, wherein said at least one processing step includes at least one of a material deposition step, a material conversion step, a dry etch step, a wet etch step, a planarization step, an ion implantation step, and a bonding step.

17. A system for controlling a manufacturing sequence including at least one processing step, said system comprising at least one processing tool, at least one alignment tool, and at least one computing means, wherein said at least one processing tool is configured to perform at least one processing step, and said at least one computing means is configured to perform the steps of:

storing a process model that correlates at least one mode of process variation within said at least one processing step with a pattern in alignment data differential between pre-processing alignment data and post-processing data, wherein said pre-processing data is generated at a first alignment step prior to said at least one processing step, and said post-processing alignment data is generated at a second alignment step after said at least one processing step;

receiving first alignment data on a substrate that is measured by one of said at least one alignment tool at said first alignment step, said first alignment data including a first set of mark placement errors as calculated by differences between positions of physical structures for alignment marks located at multiple dies with respect to a single point, said single point being located on said substrate and not included within said multiple dies, and corresponding expected positions for said physical structures for said alignment marks with respect to said single point, said corresponding expected positions derived from design locations within a lithographic mask;

receiving second alignment data on said substrate that is measured by said one or another of said at least one alignment tool at said second alignment step, said second alignment data including a second set of mark placement errors as calculated by differences between positions of said physical structures for said alignment marks located at said multiple dies with respect to said single point located on said substrate and corresponding expected positions for said physical structures for said alignment marks with respect to said single point;

determining a set of deformation coefficients representing magnitudes of modes of deformation that are present in a change in substrate deformation between measurement of said first alignment data and measurement of said second alignment data by calculating differences in corresponding data points between said first alignment data and said second alignment data;

identifying a mode of process variation by matching a pattern in said set of deformation coefficients for said substrate with said process model; and generating instructions for altering operational procedure of a processing tool among said at least one processing tool, wherein said processing tool is associated with said identified mode of process variation.

18. The system of claim 17, further comprising an alignment database storing said measured first and said measured second alignment data and in communication with said computing means to transmit said measured first and second alignment data.

19. The system of claim 17, wherein said at least one computing means is configured to perform a step of determining whether said set of deformation coefficients for said substrate is within a predetermined limit for statistical variation therefor.

20. The system of claim 17, wherein said at least one computing means is configured to perform a step of generating coefficients for a series of polynomials that are orthogonal to one another on a shape of said substrate, wherein said series of polynomials with corresponding coefficients approximate said pattern in said set of deformation coefficients.

21. The system of claim 20, wherein said at least one computing means is configured to perform a step of generating coefficients for at least another series of said polynomials that approximate each of at least one mode of process variation, wherein said mode of process variation is identified by selecting a mode of process variation that provides greatest statistical correlation between corresponding coefficients for same polynomials between said series of said at least another series.

22. The system of claim 17, wherein said at least one computing means is configured to perform a step of determining a new target for a process parameter for said processing tool based on said set of deformation coefficients and said process model.

23. The system of claim 17, wherein said at least one computing means generates said instruction employing a predetermined processing tool operation protocol encoded in said at least one computing means.

24. The system of claim 17, wherein said first alignment data and said second alignment data include at least one data selected from locations of dies on said substrate in two orthogonal directions as measured and a change in lithographic image magnification that is required to register a new image on preexisting alignment marks on said substrate from standard magnification.

25. The system of claim 17, wherein said at least one processing step includes at least one of a material deposition step, a material conversion step, a dry etch step, a wet etch step, a planarization step, an ion implantation step, and a bonding step.

* * * * *